United States Patent
Gram

(10) Patent No.: US 7,585,447 B2
(45) Date of Patent: Sep. 8, 2009

(54) TOOL WITH CLOSING MECHANISM AND METHOD OF MANUFACTURING PREFERABLY PLASTIC PARTS WITH HINGES

(76) Inventor: Jes Tougaard Gram, 10625 Pinnacle Peak Rd., Scottsdale, AZ (US) 85255

( * ) Notice: Subject to any disclaimer, the term of this patent is extended or adjusted under 35 U.S.C. 154(b) by 556 days.

(21) Appl. No.: 10/496,043

(22) PCT Filed: Nov. 15, 2002

(86) PCT No.: PCT/DK02/00770
§ 371 (c)(1),
(2), (4) Date: Jun. 28, 2005

(87) PCT Pub. No.: WO03/049917
PCT Pub. Date: Jun. 19, 2003

(65) Prior Publication Data
US 2006/0033238 A1      Feb. 16, 2006

(30) Foreign Application Priority Data
Nov. 19, 2001  (DK) ................. 2001 01721

(51) Int. Cl.
B29C 53/02 (2006.01)
B29C 45/64 (2006.01)
B65D 47/08 (2006.01)
(52) U.S. Cl. ............... 264/295; 264/339; 206/755
(58) Field of Classification Search ............. 264/295, 264/339; 206/755
See application file for complete search history.

(56) References Cited

U.S. PATENT DOCUMENTS 3,293,691 A * 12/1966 Osgood .................. 425/145
4,897,032 A    1/1990 Corteggiani
5,906,841 A *  5/1999 Bak ....................... 425/556
6,340,440 B1   1/2002 Pedersen

FOREIGN PATENT DOCUMENTS
FR      2731983     9/1996

* cited by examiner

Primary Examiner—Matthew J. Daniels

(57) ABSTRACT

A process for molding a plastic object with at least one stationary part and at least one appendage connected to the stationary part via a hinge is provided. The process uses a molding tool having a turnable middle section to mold the object. The turnable middle section rotates, the appendage is moved from an open position to a closed position, and the object is ejected from the molding tool.

6 Claims, 7 Drawing Sheets

TOOL WITH CLOSING MECHANISM AND METHOD OF MANUFACTURING PREFERABLY PLASTIC PARTS WITH HINGES

The invention relates to a procedure and a mechanism for the production preferably of plastic objects with hinges, one-component as well as multi-component objects, as well as the closing of these.

The hitherto described procedures and mechanisms for the production of plastic objects with in-molded hinges, which are to be closed in the tool, have had various defects and disadvantages. This has been resolved by the procedure and mechanism according to the present invention. There are also obtained a series of advantages and simplifications of the hitherto known molding- and follow-up-processes, which will be able to radically reduce the total cycle time and consequently the price of the finished objects.

The invention is characterized by the fact, that the object is being molded in a with, at least one turnable mold part supplied tool, where the in the tool finish-molded object, with the hinge placed in the position as it exists by the molding, e.g. normally open, and with the object still placed on the turnable middle section, it turns further forward against at least one new station together with the tunable middle section, while or whereupon a for the purpose serving mechanism closes the hinged object to its final position in one or more stages before or during the ejection of the object from the tool.

The turnable middle section of the tool preferably has a cross section, which is designed as a regular polygon, suitably a square. This square conveniently can have the corners rounded, so there will be required less opening of the tool in order to turn the middle section around. For the same reason the middle section can suitably, instead of being a big section, be split up into two or more turnable mold parts. Besides a square or an adjusted square the cross-section of the turnable mold part can be designed as a regular hexabon, an octagon or another preferably regular polygon, where two opposite sides are parallel. In this way there will by the tuning arise 2, 4, 6, 8 etc. stations, where/in between where there can exist filling, assembling, ejection and other kinds of handling of the molded objects.

Figure 1:
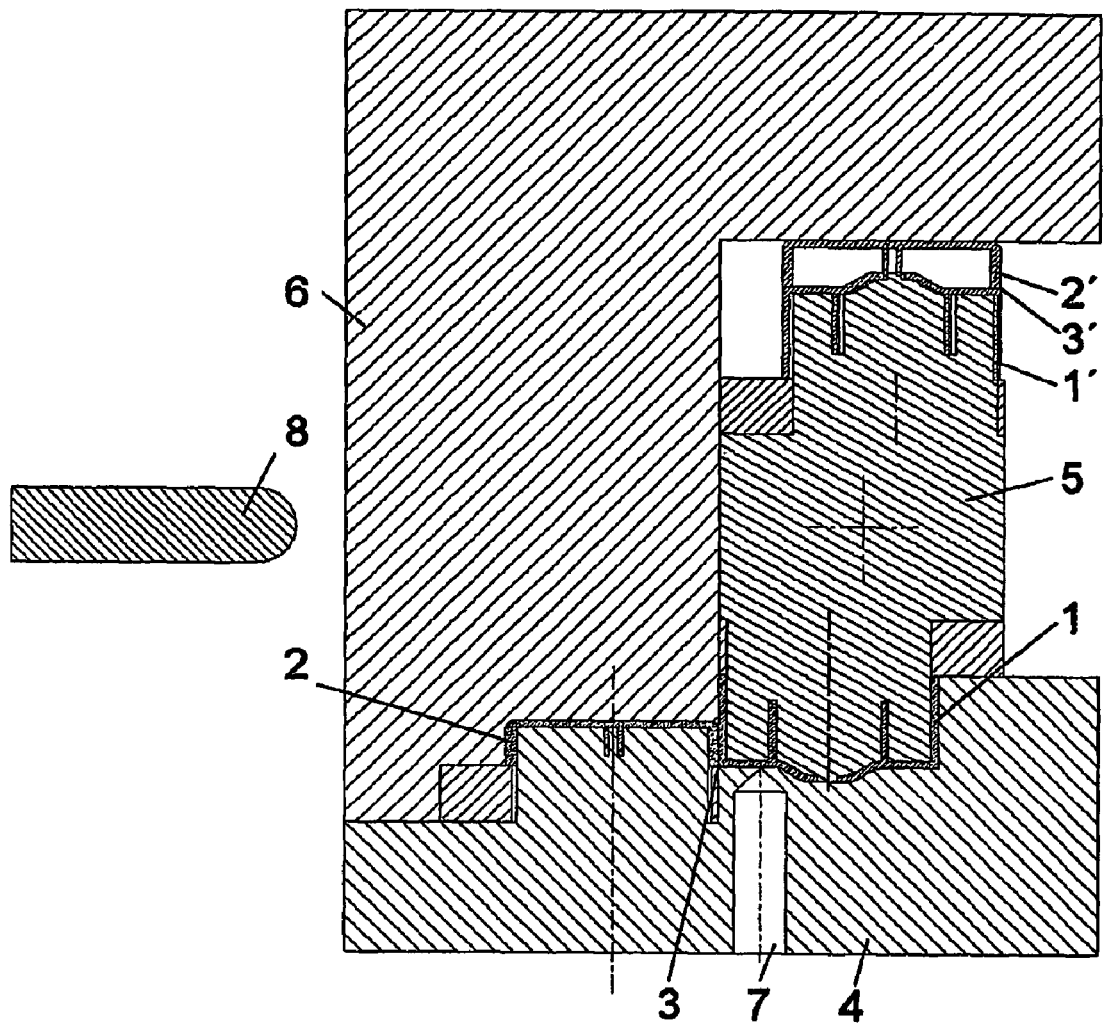
Figure 2:
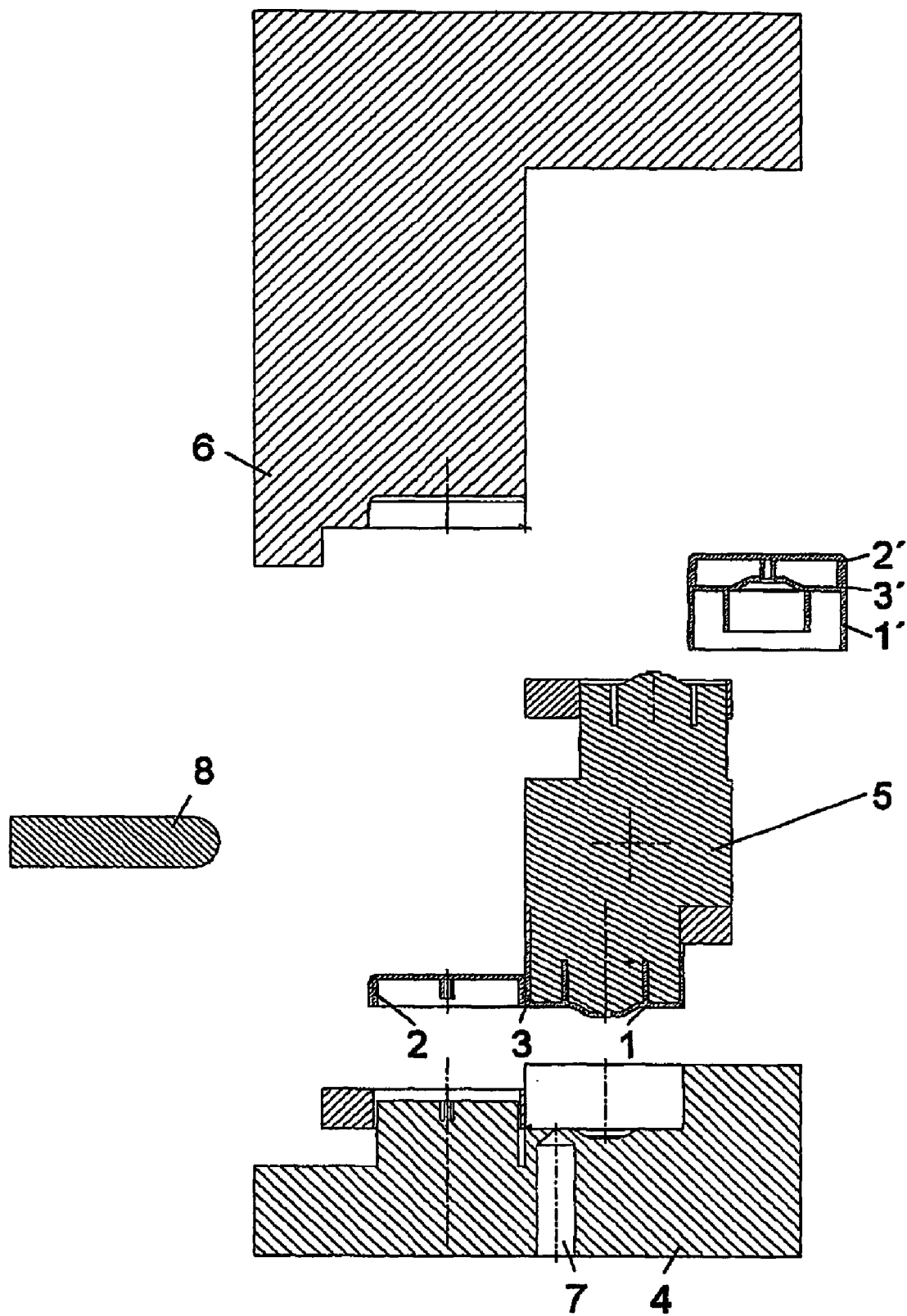
Figure 3:
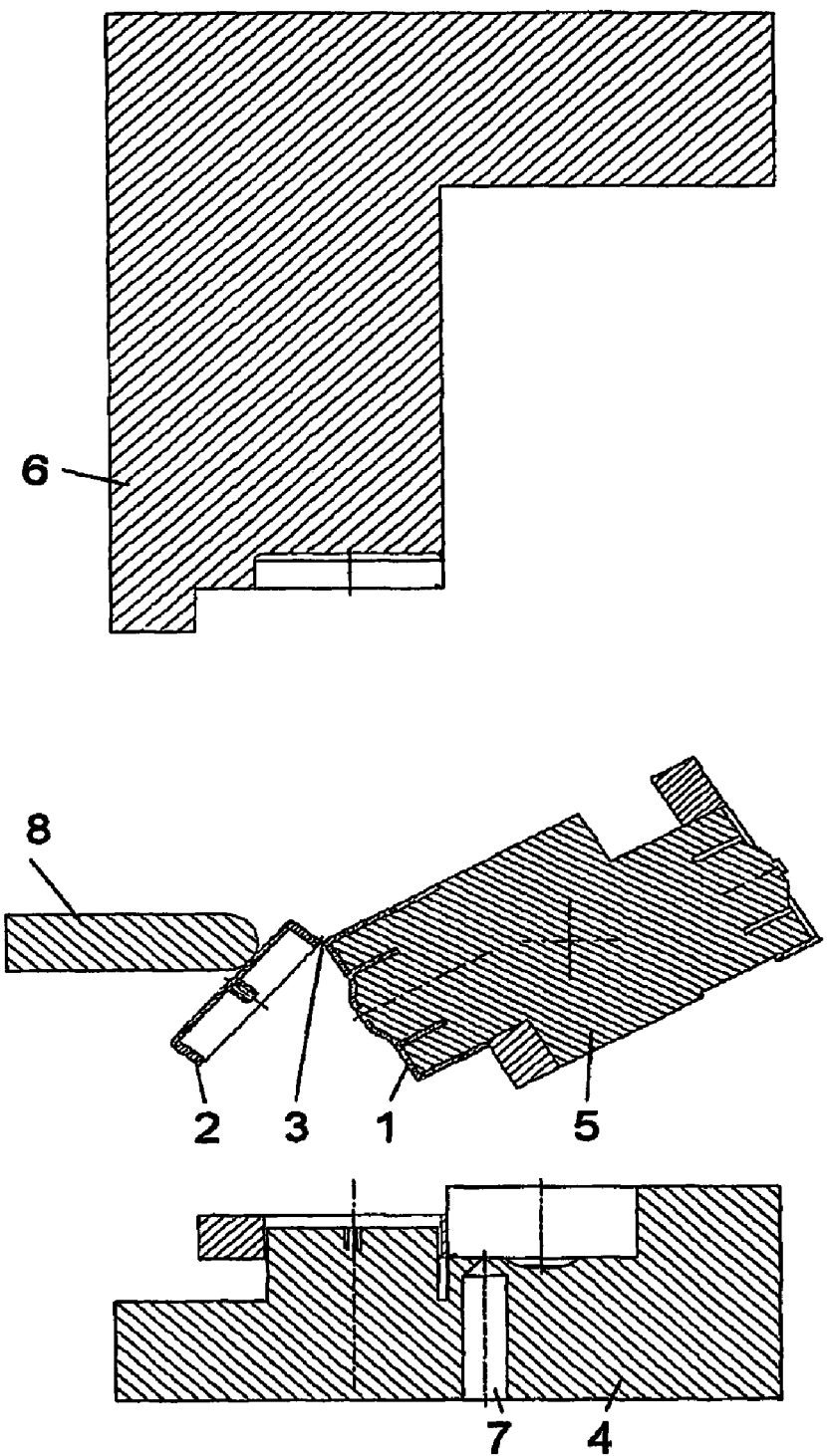
Figure 4:
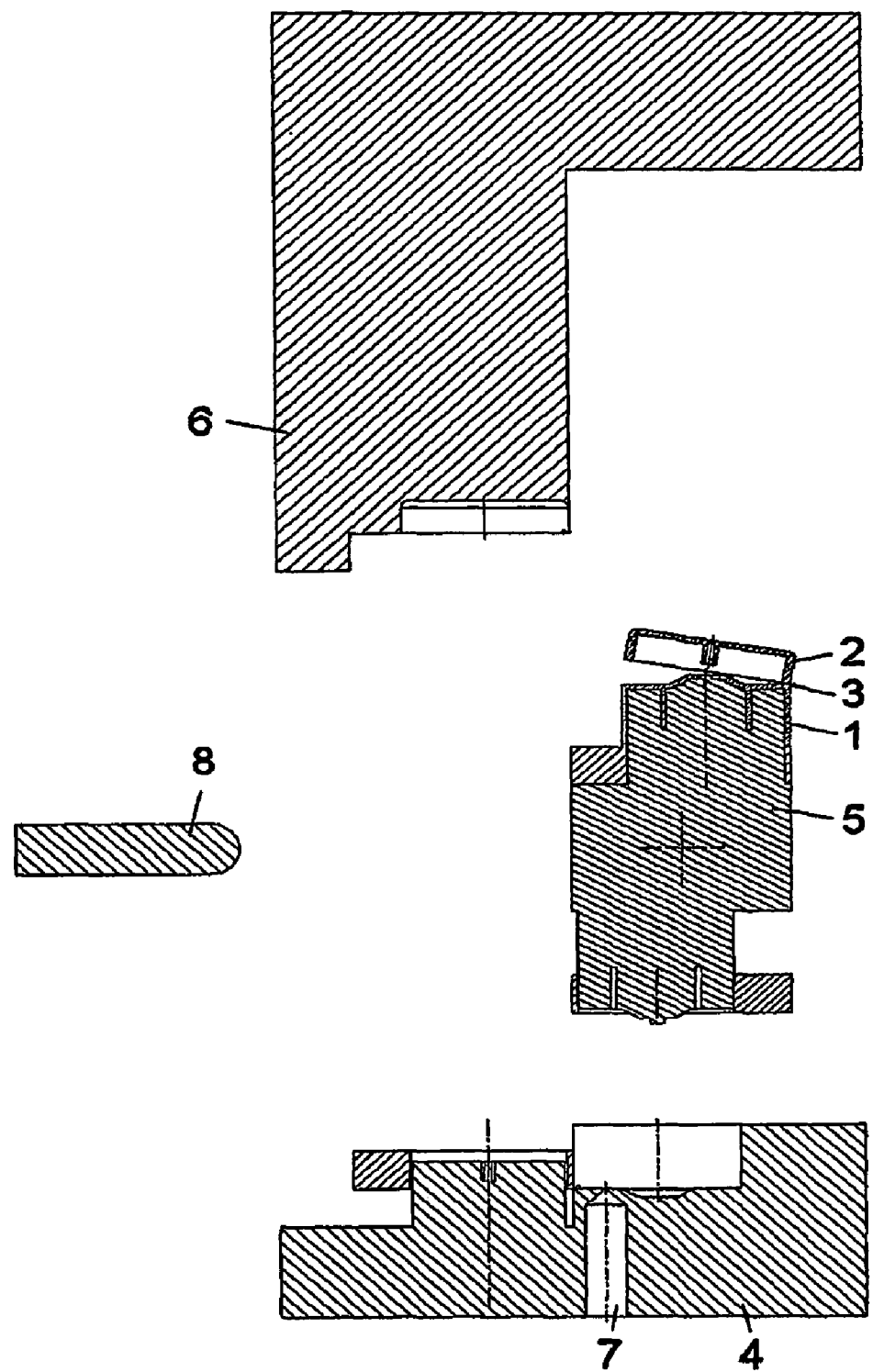
Figure 5:
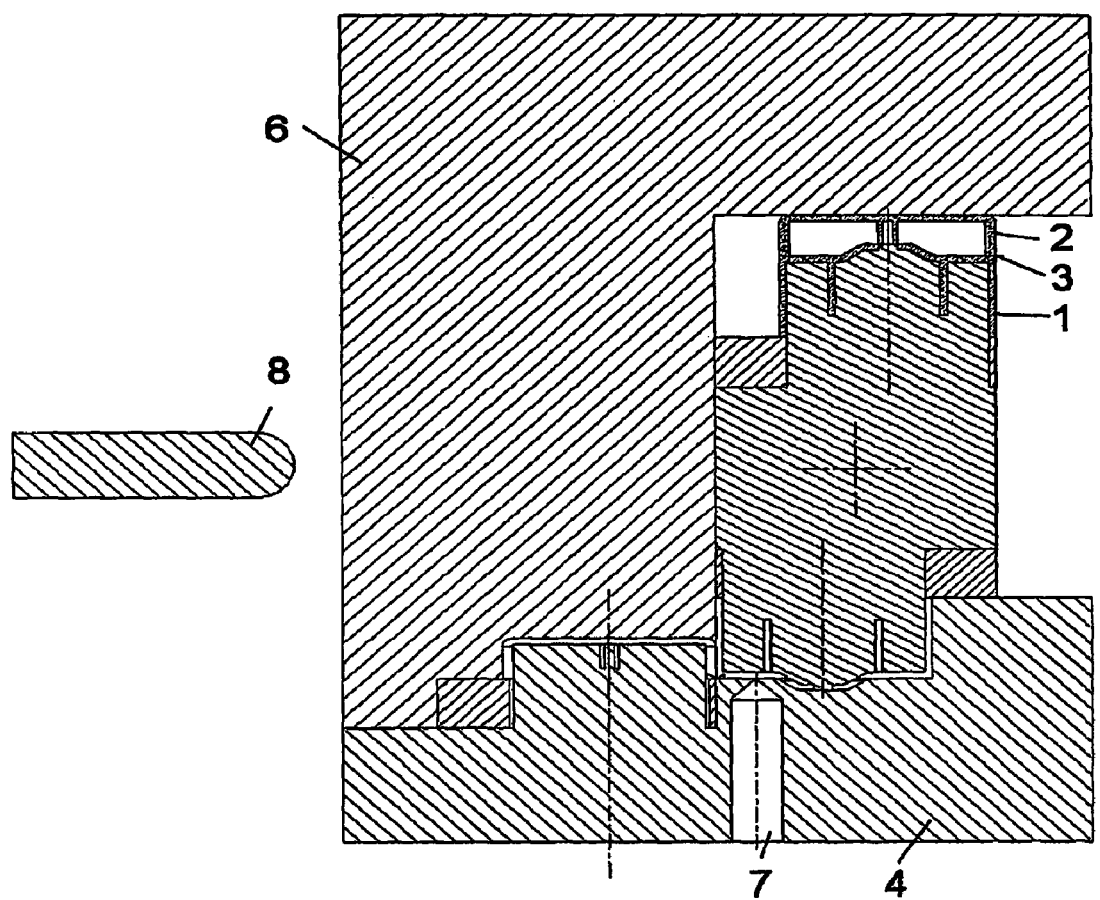
Figure 6:
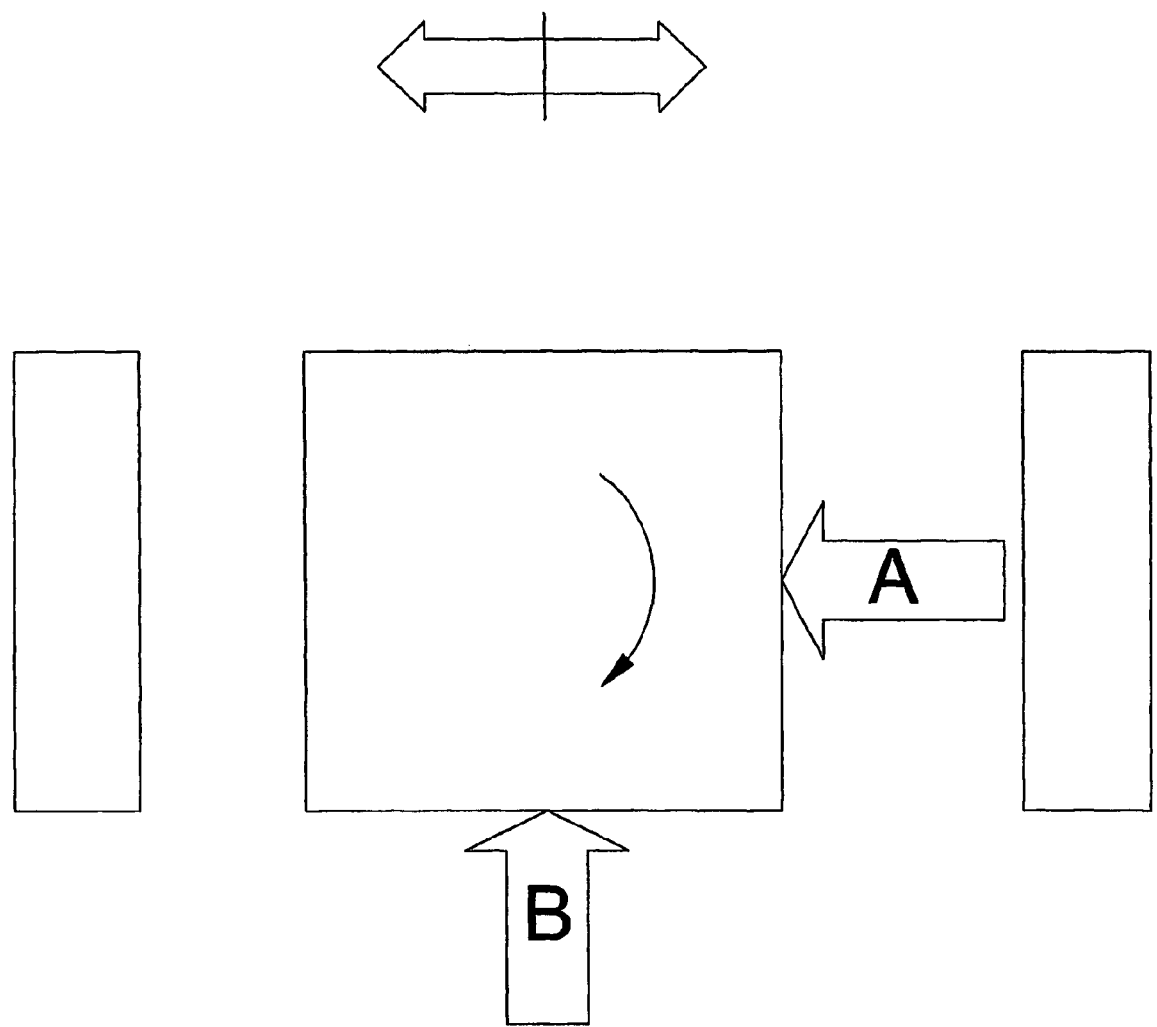
Figure 7:
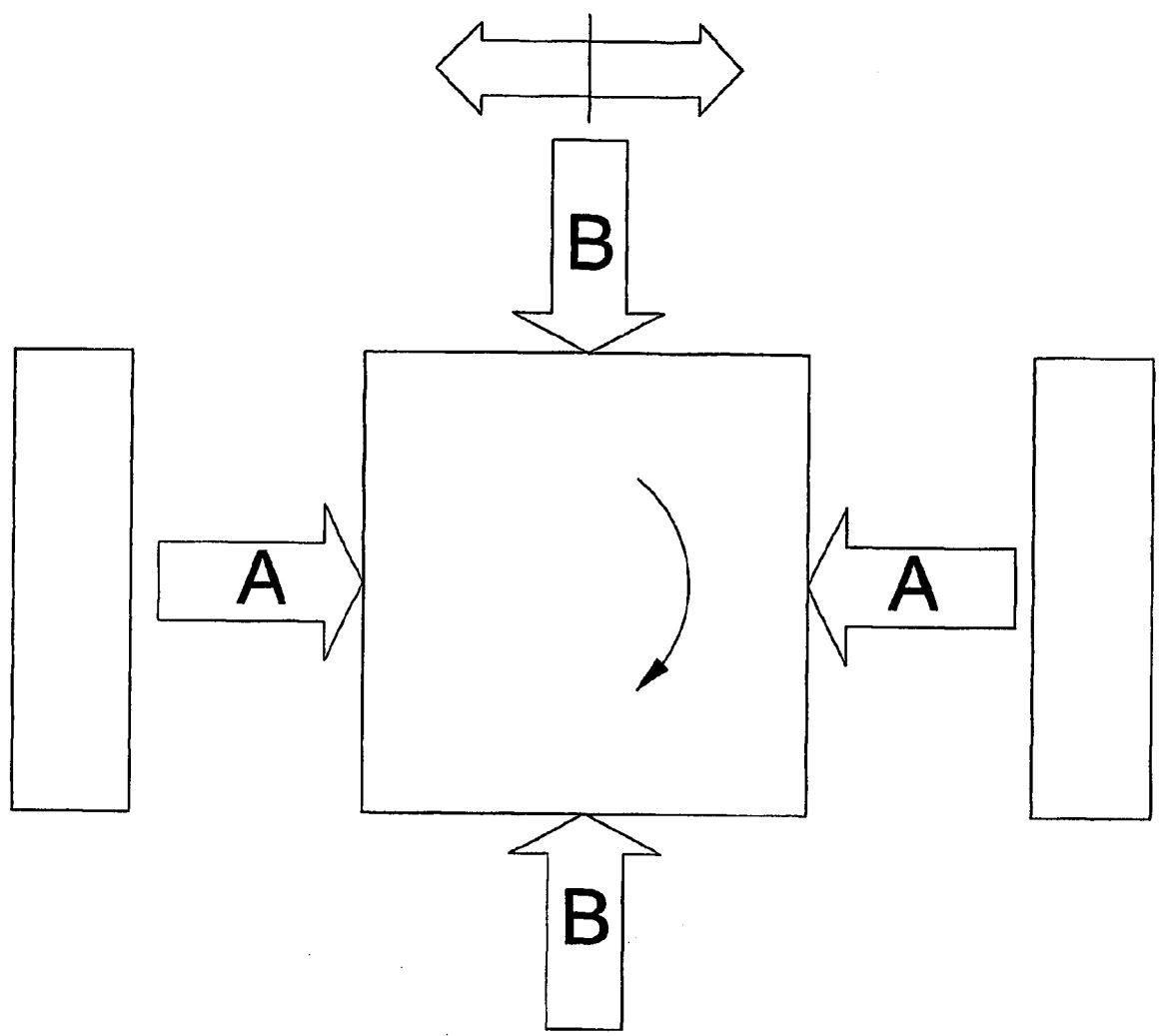

The different applications and advantages by the procedure and the mechanism according to the invention are mentioned further under the description to the drawing, where FIG. 1 shows a tool according to the invention seen from above in closed condition in the first station, FIG. 2 shows the same in open condition still in the first station, FIG. 3 shows the same in open condition during the turning towards the second station, FIG. 4 shows the same in open condition situated in the second station, FIG. 5 shows the same in closed condition at the second station, FIG. 6 shows a principle sketch of another tool according to the invention seen from above, and FIG. 7 shows a principle sketch of a third tool according to the invention, where there at the same time is molded from two opposite placed sides as in a sandwich tool.

In FIG. 1 is shown a tool according to the invention seen from above in closed condition with two molded objects, each comprising a stationary part (1) and (1'), which is connected with a movable part, here being made out of a flip lid (2) and (2'), which in one end has a hinge (3) and (3'), that also is connected to the stationary part (1) and (1'). The lowest placed object has just been molded in the tool between its stationary part (4) and the turnable middle section (5) as well as the movable mold-part (6). The uppermost object is completely finish-molded and ready for ejection, just as it is remarked, that the flip lid (2') of the uppermost object and its belonging hinge (3') are closed firmly on the stationary part (1'). Contrary to this on the lowest object just molded flip lid (2) with its belonging hinge (3) is situated in fully opened condition, that is in an angle of 180 degrees in relation to the stationary part (1) due to mold technical considerations. On the figure is furthermore shown the movable mold part (6), an inlet channel (7) in the stationary mold part (4), plus the special closing mechanism (8), here shown in withdrawn position.

FIG. 2 shows the same tool open, whereby the finished object with the now in a closed condition placed flip lid (2') with its belonging hinge (3') just has been ejected from the turnable middle section (4). The stationary part (1) of the molded object is still firmly placed on the turnable middle section (5), while the movable part with its flip lid (2) with its belonging hinge (2) still is in the position in which it was molded.

FIG. 3 shows the same tool still open, but where the turnable middle section (5) is during turning. The special closing mechanism (8) is hereby driven forward until contact with the flip lid (2), which hereby is turned around with the hinge (3) about to be closed against the stationary part (1) of the object.

In FIG. 4 the turnable middle section (5) of the same tool has arrived to the next station, still with the tool in open position. The special closing mechanism (8) is back against its start position outside the space between the two mold-parts (4) and (6). The flip lid (2) is now closed almost completely down against the stationary part (1) of the object.

On FIG. 5 is seen the same tool in closed condition after the completion of a total molding cycle. Seen in comparison with FIG. 1 the turnable middle section (5) is turned 180 degrees forward from its start position. The lowest mold cavity is now formed between the stationary mold part (4) on one side and the turnable mold part (5) and the movable mold part (6) on the other side, and is ready for receiving a new portion of molding material through the inlet (7). The uppermost object now has got the flip lid (2) closed firmly against the stationary part (1) of the object by assistance of the closing movement of the tool and is now ready for being ejected, when the tool opens again, when a new cycle takes its beginning as the turnable middle section (5) is turned further forward against its start position.

FIG. 6 shows a principle sketch of another design of a tool according to the invention, where the closing of the movable part of the object against the stationary part of the object takes place in the position named as B, e.g. by means of a robot or another closing mechanism, which is not shown on the figure, at the same time as the tool is closed and occupied in molding a new object in the position named as A.

FIG. 7 shows a principle sketch of a third design of a tool, where there here with the mold closed are molded from two opposite placed sides as in a sandwich tool in the two positions named as A, simultaneously with, both on the top and on the bottom of the figure by means of robots or other closing mechanisms, which are not shown at the figure, are taken care of that the two simultaneously molded objects movable and stationary part are closed firmly against each other in the two positions named as B.

The invention claimed is:

1. A process for molding a plastic object with at least one stationary part and at least one appendage connected to the stationary part via a hinge, the appendage being movable between an open position and a closed position, comprising:

providing a molding tool having a movable mold part and a turnable middle section;

molding the stationary part of the object onto the turnable middle section, the turnable middle section being in a first position, molding the appendage of the object onto the movable mold part, the appendage connected to the stationary part via the hinge and the appendage being in the open position;

rotating the turnable middle section to a second position, the stationary part remaining on the turnable middle section during rotation of the turnable middle section, the appendage being removed from contact with the movable mold part and remaining connected to the stationary part via the hinge during rotation of the turnable middle section;

a closing mechanism moving the appendage to the closed position while the turnable middle section rotates from the first position to the second position, the closing mechanism moving in a linear manner relative to the turnable middle section, a force from the rotation of the turnable middle section being used to move the appendage from the open position to the closed position; and ejecting the object from the molding tool.

2. A process for molding a plastic object with at least one stationary part and at least one appendage connected to the stationary part via a hinge, the appendage being movable between an open position and a closed position, comprising:

providing a molding tool having a movable mold part and a turnable middle section;

molding the stationary part of the object onto the turnable middle section, the turnable middle section being in a first position, molding the appendage of the object onto the movable mold part, the appendage connected to the stationary part via the hinge and the appendage being in the open position;

rotating the turnable middle section to a second position, the stationary part remaining on the turnable middle section during rotation of the turnable middle section, the appendage being removed from contact with the movable mold part and remaining connected to the stationary part via the hinge during rotation of the turnable middle section;

a closing mechanism moving the appendage to the closed position while the turnable middle section rotates from the first position to the second position, wherein moving the appendage to the closed position further comprises the closing mechanism partly closing the hinge, and firmly pressing the appendage on the stationary part of the object, pressing the appendage on the stationary part of the object occurs in connection with a closing of the molding tool; and ejecting the object from the molding tool when the molding tool opens.

3. A process as in claim 2 wherein the closing mechanism moves at an angle of one of 90 degrees, 60 degrees, or 120 degrees relative to a closing direction of the molding tool.

4. A process as in claim 2 wherein the moving the appendage to the closed position occurs in a sandwich tool simultaneously on at least two opposite sides of the turnable middle section.

5. A process as in claim 2 wherein molding occurs on a first set of at least two opposite sides of the turnable middle section when the molding tool is in a closed position and simultaneously moving the appendage to the closed position occurs on a second set of at least two opposite sides of the turnable middle section.

6. A process as in claim 2 wherein the closing mechanism includes a rolling mechanism to assist with moving the appendage to the closed position.

* * * * *